US008539112B2

(12) United States Patent
Craft et al.

(10) Patent No.: US 8,539,112 B2
(45) Date of Patent: *Sep. 17, 2013

(54) TCP/IP OFFLOAD DEVICE (75) Inventors: Peter K. Craft, San Francisco, CA (US); Clive M. Philbrick, San Jose, CA (US); Laurence B. Boucher, Saratoga, CA (US); David A. Higgen, Saratoga, CA (US); Stephen E. J. Blightman, San Jose, CA (US); Daryl D. Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/108,729

(22) Filed: May 16, 2011

(65) Prior Publication Data

US 2011/0280243 A1 Nov. 17, 2011

Related U.S. Application Data (63) Continuation-in-part of application No. 12/325,941, filed on Dec. 1, 2008, now Pat. No. 7,945,699, which is
(Continued)

(51) Int. Cl.
*H04L 29/06* (2006.01)

(52) U.S. Cl.
USPC .......................................... 709/250; 709/230

(58) Field of Classification Search
USPC .................... 370/254–340; 709/250, 230
See application file for complete search history.

(56) References Cited

U.S. PATENT DOCUMENTS

| 4,366,538 A | 12/1982 | Johnson et al. |
| 4,485,455 A | 11/1984 | Boone et al. |

(Continued)

FOREIGN PATENT DOCUMENTS

| EP | 689138 A2 | 12/1995 |
| EP | 689139 A2 | 12/1995 |

(Continued)

OTHER PUBLICATIONS

Beach, Bob. "UltraNet: An Architecture for Gigabit Networking." IEEE Computer Society Press publication from 15th Conference on Local Computer Networks. Sep. 30-Oct. 3, 1990. 18 pages.

(Continued)

*Primary Examiner* — Ayaz Sheikh
*Assistant Examiner* — Debebe Asefa
(74) *Attorney, Agent, or Firm* — Mark Lauer; Silicon Edge Law Group LLP (57) ABSTRACT

A host CPU runs a network protocol processing stack that provides instructions not only to process network messages but also to allocate processing of certain network messages to a specialized network communication device, offloading some of the most time consuming protocol processing from the host CPU to the network communication device. By allocating common and time consuming network processes to the device, while retaining the ability to handle less time intensive and more varied processing on the host stack, the network communication device can be relatively simple and cost effective. The host CPU, operating according to instructions from the stack, and the network communication device together determine whether and to what extent a given message is processed by the host CPU or by the network communication device.

19 Claims, 3 Drawing Sheets

Related U.S. Application Data (63) a continuation of application No. 10/881,271, filed on Jun. 29, 2004, now Pat. No. 7,461,160, which is a continuation of application No. 09/789,366, filed on Feb. 20, 2001, now Pat. No. 6,757,746, which is a continuation-in-part of application No. 09/464,283, filed on Dec. 15, 1999, now Pat. No. 6,427,173, which is a continuation of application No. 09/439,603, filed on Nov. 12, 1999, now Pat. No. 6,247,060, which is a continuation of application No. 09/067,544, filed on Apr. 27, 1998, now Pat. No. 6,226,680, application No. 13/108,729, which is a continuation-in-part of application No. 11/027,842, filed on Dec. 30, 2004, which is a continuation of application No. 10/706,398, filed on Nov. 12, 2003, now Pat. No. 6,941,386, which is a continuation of application No. 10/208,093, filed on Jul. 29, 2002, now Pat. No. 6,697,868, which is a continuation-in-part of application No. 09/514,425, filed on Feb. 28, 2000, now Pat. No. 6,427,171, which is a continuation-in-part of application No. 09/141,713, filed on Aug. 28, 1998, now Pat. No. 6,389,479, application No. 13/108,729, which is a continuation-in-part of application No. 09/067,544, filed on Apr. 27, 1998, now Pat. No. 6,226,680.

(60) Provisional application No. 60/061,809, filed on Oct. 14, 1997, provisional application No. 60/098,296, filed on Aug. 27, 1998.

(56) References Cited

U.S. PATENT DOCUMENTS

| | | |
|---|---|---|
| 4,485,460 A | 11/1984 | Stambaugh |
| 4,589,063 A | 5/1986 | Shah et al. |
| 4,700,185 A | 10/1987 | Balph et al. |
| 4,991,133 A | 2/1991 | Davis et al. |
| 5,056,058 A | 10/1991 | Hirata et al. |
| 5,058,110 A | 10/1991 | Beach et al. |
| 5,097,442 A | 3/1992 | Ward et al. |
| 5,129,093 A | 7/1992 | Muramatsu et al. |
| 5,163,131 A | 11/1992 | Row et al. |
| 5,212,778 A | 5/1993 | Dally et al. |
| 5,274,768 A | 12/1993 | Traw et al. |
| 5,280,477 A | 1/1994 | Trapp |
| 5,281,963 A | 1/1994 | Ishikawa et al. |
| 5,289,580 A | 2/1994 | Latif et al. |
| 5,303,344 A | 4/1994 | Yokoyama et al. |
| 5,392,391 A | 2/1995 | Caulk et al. |
| 5,412,782 A | 5/1995 | Hausman et al. |
| 5,418,912 A | 5/1995 | Christenson |
| 5,448,566 A | 9/1995 | Richter et al. |
| 5,485,455 A | 1/1996 | Dobbins et al. |
| 5,485,460 A | 1/1996 | Schrier et al. |
| 5,485,579 A | 1/1996 | Hitz et al. |
| 5,506,966 A | 4/1996 | Ban |
| 5,511,169 A | 4/1996 | Suda |
| 5,517,611 A | 5/1996 | Deering |
| 5,517,668 A | 5/1996 | Szwerinski et al. |
| 5,522,065 A | 5/1996 | Neufeld |
| 5,524,212 A | 6/1996 | Somani et al. |
| 5,524,250 A | 6/1996 | Chesson et al. |
| 5,535,375 A | 7/1996 | Eshel et al. |
| 5,548,730 A | 8/1996 | Young et al. |
| 5,553,241 A | 9/1996 | Shirakihara |
| 5,557,798 A | 9/1996 | Skeen et al. |
| 5,566,170 A | 10/1996 | Bakke et al. |
| 5,574,919 A | 11/1996 | Netravali et al. |
| 5,588,121 A | 12/1996 | Reddin et al. |
| 5,590,328 A | 12/1996 | Seno et al. |
| 5,592,622 A | 1/1997 | Isfeld et al. |
| 5,596,574 A | 1/1997 | Perlman et al. |
| 5,598,410 A | 1/1997 | Stone |
| 5,602,987 A | 2/1997 | Harari et al. |
| 5,619,650 A | 4/1997 | Bach et al. |
| 5,629,933 A | 5/1997 | Delp et al. |
| 5,633,780 A | 5/1997 | Cronin |
| 5,634,099 A | 5/1997 | Andrews et al. |
| 5,634,127 A | 5/1997 | Cloud et al. |
| 5,642,482 A | 6/1997 | Pardillos |
| 5,664,114 A | 9/1997 | Krech, Jr. et al. |
| 5,671,355 A | 9/1997 | Collins |
| 5,678,060 A | 10/1997 | Yokoyama et al. |
| 5,682,534 A | 10/1997 | Kapoor et al. |
| 5,684,954 A | 11/1997 | Kaiserswerth et al. |
| 5,689,550 A | 11/1997 | Garson et al. |
| 5,692,130 A | 11/1997 | Shobu et al. |
| 5,699,317 A | 12/1997 | Sartore et al. |
| 5,699,350 A | 12/1997 | Kraslavsky |
| 5,701,434 A | 12/1997 | Nakagawa |
| 5,701,516 A | 12/1997 | Cheng et al. |
| 5,706,514 A | 1/1998 | Bonola |
| 5,724,552 A | 3/1998 | Taoda |
| 5,727,142 A | 3/1998 | Chen |
| 5,732,220 A | 3/1998 | Mayfield et al. |
| 5,742,765 A | 4/1998 | Wong et al. |
| 5,749,095 A | 5/1998 | Hagersten |
| 5,751,715 A | 5/1998 | Chan et al. |
| 5,751,723 A | 5/1998 | Vanden Heuvel et al. |
| 5,752,078 A | 5/1998 | Delp et al. |
| 5,758,084 A | 5/1998 | Silverstein et al. |
| 5,758,089 A | 5/1998 | Gentry et al. |
| 5,758,186 A | 5/1998 | Hamilton et al. |
| 5,758,194 A | 5/1998 | Kuzma |
| 5,768,527 A | 6/1998 | Zhu et al. |
| 5,768,618 A | 6/1998 | Erickson et al. |
| 5,771,349 A | 6/1998 | Picazo, Jr. et al. |
| 5,774,660 A | 6/1998 | Brendel et al. |
| 5,778,013 A | 7/1998 | Jedwab |
| 5,778,419 A | 7/1998 | Hansen et al. |
| 5,790,804 A | 8/1998 | Osborne |
| 5,794,061 A | 8/1998 | Hansen et al. |
| 5,799,150 A | 8/1998 | Hamilton et al. |
| 5,802,258 A | 9/1998 | Chen |
| 5,802,580 A | 9/1998 | McAlpine |
| 5,809,328 A | 9/1998 | Nogales et al. |
| 5,809,527 A | 9/1998 | Cooper et al. |
| 5,812,775 A | 9/1998 | Van Seters et al. |
| 5,815,646 A | 9/1998 | Purcell et al. |
| 5,819,111 A | 10/1998 | Davies et al. |
| 5,828,835 A | 10/1998 | Isfeld et al. |
| 5,835,370 A | 11/1998 | Nakamura |
| 5,848,293 A | 12/1998 | Gentry |
| 5,870,394 A | 2/1999 | Oprea |
| 5,872,919 A | 2/1999 | Wakeland |
| 5,878,225 A | 3/1999 | Bilansky et al. |
| 5,878,227 A | 3/1999 | Wade et al. |
| 5,892,903 A | 4/1999 | Klaus |
| 5,898,713 A | 4/1999 | Melzer et al. |
| 5,913,028 A | 6/1999 | Wang et al. |
| 5,915,094 A | 6/1999 | Kouloheris et al. |
| 5,917,828 A | 6/1999 | Thompson |
| 5,920,566 A | 7/1999 | Hendel et al. |
| 5,923,759 A | 7/1999 | Lee |
| 5,926,642 A | 7/1999 | Favor |
| 5,930,830 A | 7/1999 | Mendelson et al. |
| 5,931,918 A | 8/1999 | Row et al. |
| 5,935,205 A | 8/1999 | Murayama et al. |
| 5,935,249 A | 8/1999 | Stern et al. |
| 5,937,169 A | 8/1999 | Connery et al. |
| 5,941,969 A | 8/1999 | Ram et al. |
| 5,941,972 A | 8/1999 | Hoese et al. |
| 5,946,708 A | 8/1999 | Fang et al. |
| 5,950,203 A | 9/1999 | Stakuis et al. |
| 5,963,876 A | 10/1999 | Manssen et al. |
| 5,978,844 A | 11/1999 | Tsuchiya et al. |
| 5,987,022 A | 11/1999 | Geiger et al. |
| 5,991,299 A | 11/1999 | Radogna et al. |
| 5,996,013 A | 11/1999 | Delp et al. |
| 5,996,024 A | 11/1999 | Blumenau |
| 6,005,849 A | 12/1999 | Roach et al. |
| 6,009,478 A | 12/1999 | Panner et al. |

| | | | |
|---|---|---|---|
| 6,014,380 A | 1/2000 | Hendel et al. |
| 6,014,557 A | 1/2000 | Morton et al. |
| 6,016,513 A | 1/2000 | Lowe |
| 6,021,446 A | 2/2000 | Gentry, Jr. |
| 6,021,507 A | 2/2000 | Chen |
| 6,026,452 A | 2/2000 | Pitts |
| 6,034,963 A | 3/2000 | Minami et al. |
| 6,038,562 A | 3/2000 | Anjur et al. |
| 6,041,058 A | 3/2000 | Flanders et al. |
| 6,041,381 A | 3/2000 | Hoese |
| 6,044,438 A | 3/2000 | Olnowich |
| 6,047,323 A | 4/2000 | Krause |
| 6,047,356 A | 4/2000 | Anderson et al. |
| 6,049,528 A | 4/2000 | Hendel et al. |
| 6,057,863 A | 5/2000 | Olarig |
| 6,061,368 A | 5/2000 | Hitzelberger |
| 6,065,096 A | 5/2000 | Day et al. |
| 6,067,569 A | 5/2000 | Khaki et al. |
| 6,067,595 A | 5/2000 | Lindenstruth |
| 6,070,200 A | 5/2000 | Gates et al. |
| 6,078,564 A | 6/2000 | Lakshman et al. |
| 6,078,733 A | 6/2000 | Osborne |
| 6,085,234 A | 7/2000 | Pitts et al. |
| 6,097,734 A | 8/2000 | Gotesman et al. |
| 6,101,555 A | 8/2000 | Goshey et al. |
| 6,111,673 A | 8/2000 | Chang et al. |
| 6,115,615 A | 9/2000 | Ota et al. |
| 6,122,670 A | 9/2000 | Bennett et al. |
| 6,141,701 A | 10/2000 | Whitney |
| 6,141,705 A | 10/2000 | Anand et al. |
| 6,145,017 A | 11/2000 | Ghaffari |
| 6,157,944 A | 12/2000 | Pedersen |
| 6,157,955 A | 12/2000 | Narad et al. |
| 6,172,980 B1 | 1/2001 | Flanders et al. |
| 6,172,981 B1 | 1/2001 | Cox et al. |
| 6,173,333 B1 | 1/2001 | Jolitz et al. |
| 6,178,483 B1 | 1/2001 | Runaldue et al. |
| 6,181,705 B1 | 1/2001 | Branstad et al. |
| 6,185,215 B1 | 2/2001 | Aho |
| 6,202,105 B1 | 3/2001 | Gates et al. |
| 6,219,693 B1 | 4/2001 | Napolitano et al. |
| 6,223,242 B1 | 4/2001 | Sheafor et al. |
| 6,226,680 B1 | 5/2001 | Boucher et al. |
| 6,233,242 B1 | 5/2001 | Mayer et al. |
| 6,233,543 B1 | 5/2001 | Butts et al. |
| 6,243,667 B1 | 6/2001 | Kerr et al. |
| 6,246,683 B1 | 6/2001 | Connery et al. |
| 6,247,060 B1 | 6/2001 | Boucher et al. |
| 6,279,051 B1 | 8/2001 | Gates et al. |
| 6,289,023 B1 | 9/2001 | Dowling et al. |
| 6,298,403 B1 | 10/2001 | Suri et al. |
| 6,301,612 B1 | 10/2001 | Selitrennikoff et al. |
| 6,324,649 B1 | 11/2001 | Eyres et al. |
| 6,334,153 B2 | 12/2001 | Boucher et al. |
| 6,343,345 B1 | 1/2002 | Hilla et al. |
| 6,343,360 B1 | 1/2002 | Feinleib |
| 6,345,301 B1 | 2/2002 | Burns et al. |
| 6,345,302 B1 | 2/2002 | Bennett et al. |
| 6,356,951 B1 | 3/2002 | Gentry, Jr. |
| 6,370,114 B1 | 4/2002 | Gullicksen et al. |
| 6,370,599 B1 | 4/2002 | Anan et al. |
| 6,385,647 B1 | 5/2002 | Willis et al. |
| 6,389,468 B1 | 5/2002 | Muller et al. |
| 6,389,479 B1 | 5/2002 | Boucher et al. |
| 6,393,487 B2 | 5/2002 | Boucher et al. |
| 6,418,169 B1 | 7/2002 | Datari |
| 6,421,742 B1 | 7/2002 | Tillier |
| 6,421,753 B1 | 7/2002 | Hoese et al. |
| 6,427,169 B1 | 7/2002 | Elzur |
| 6,427,171 B1 | 7/2002 | Craft et al. |
| 6,427,173 B1 | 7/2002 | Boucher et al. |
| 6,430,626 B1 | 8/2002 | Witkowski et al. |
| 6,434,620 B1 | 8/2002 | Boucher et al. |
| 6,434,651 B1 | 8/2002 | Gentry, Jr. |
| 6,449,656 B1 | 9/2002 | Elzur et al. |
| 6,452,915 B1 | 9/2002 | Jorgensen |
| 6,453,360 B1 | 9/2002 | Muller et al. |
| 6,453,406 B1 | 9/2002 | Sarnikowski et al. |
| 6,470,397 B1 | 10/2002 | Shah et al. |
| 6,470,415 B1 | 10/2002 | Starr et al. |
| 6,473,425 B1 | 10/2002 | Bellaton et al. |
| 6,480,489 B1 | 11/2002 | Muller et al. |
| 6,483,804 B1 | 11/2002 | Muller et al. |
| 6,487,202 B1 | 11/2002 | Klausmeier et al. |
| 6,487,654 B2 | 11/2002 | Dowling |
| 6,490,631 B1 | 12/2002 | Teich et al. |
| 6,502,144 B1 | 12/2002 | Accarie |
| 6,523,119 B2 | 2/2003 | Pavlin et al. |
| 6,526,446 B1 | 2/2003 | Yang et al. |
| 6,542,504 B1 | 4/2003 | Mahler et al. |
| 6,570,884 B1 | 5/2003 | Connery et al. |
| 6,591,302 B2 | 7/2003 | Boucher et al. |
| 6,591,310 B1 | 7/2003 | Johnson |
| 6,594,261 B1 | 7/2003 | Boura et al. |
| 6,631,484 B1 | 10/2003 | Born |
| 6,648,611 B2 | 11/2003 | Morse et al. |
| 6,650,640 B1 | 11/2003 | Muller et al. |
| 6,657,757 B1 | 12/2003 | Chang et al. |
| 6,658,480 B2 | 12/2003 | Boucher et al. |
| 6,678,283 B1 | 1/2004 | Teplitsky |
| 6,681,364 B1 | 1/2004 | Calvignac et al. |
| 6,683,851 B1 | 1/2004 | Willkie et al. |
| 6,687,758 B2 | 2/2004 | Craft et al. |
| 6,697,366 B1 | 2/2004 | Kim |
| 6,697,868 B2 | 2/2004 | Craft et al. |
| 6,748,502 B2 | 6/2004 | Watanabe et al. |
| 6,751,665 B2 | 6/2004 | Philbrick et al. |
| 6,757,746 B2 | 6/2004 | Boucher et al. |
| 6,765,901 B1 | 7/2004 | Johnson et al. |
| 6,807,581 B1 | 10/2004 | Starr et al. |
| 6,842,896 B1 | 1/2005 | Redding et al. |
| 6,862,264 B1 | 3/2005 | Moura et al. |
| 6,912,522 B2 | 6/2005 | Edgar |
| 6,938,092 B2 | 8/2005 | Burns |
| 6,941,386 B2 | 9/2005 | Craft et al. |
| 6,965,941 B2 | 11/2005 | Boucher et al. |
| 6,976,148 B2 | 12/2005 | Arimilli et al. |
| 6,980,545 B1 | 12/2005 | Lindgren et al. |
| 6,996,070 B2 | 2/2006 | Starr et al. |
| 7,016,361 B2 | 3/2006 | Swonk et al. |
| 7,042,898 B2 | 5/2006 | Blightman et al. |
| 7,047,320 B2 | 5/2006 | Arimilli et al. |
| 7,073,196 B2 | 7/2006 | Dowd et al. |
| 7,076,568 B2 | 7/2006 | Philbrick et al. |
| 7,089,326 B2 | 8/2006 | Boucher et al. |
| 7,093,099 B2 | 8/2006 | Bodas et al. |
| 7,124,205 B2 | 10/2006 | Craft et al. |
| 7,133,940 B2 | 11/2006 | Blightman et al. |
| 7,167,926 B1 | 1/2007 | Boucher et al. |
| 7,167,927 B2 | 1/2007 | Philbrick et al. |
| 7,174,393 B2 | 2/2007 | Boucher et al. |
| 7,181,531 B2 | 2/2007 | Pinkerton et al. |
| 7,185,266 B2 | 2/2007 | Blightman et al. |
| 7,187,679 B2 | 3/2007 | Dally et al. |
| 7,191,241 B2 | 3/2007 | Boucher et al. |
| 7,191,318 B2 | 3/2007 | Tripathy et al. |
| 7,237,036 B2 | 6/2007 | Boucher et al. |
| 7,254,696 B2 | 8/2007 | Mittal et al. |
| 7,260,518 B2 | 8/2007 | Kerr et al. |
| 7,283,522 B2 | 10/2007 | Siddabathuni |
| 7,284,070 B2 | 10/2007 | Boucher et al. |
| 7,287,092 B2 | 10/2007 | Sharp |
| 7,337,241 B2 | 2/2008 | Boucher et al. |
| 7,461,160 B2 | 12/2008 | Boucher et al. |
| 7,472,156 B2 | 12/2008 | Philbrick et al. |
| 7,496,689 B2 | 2/2009 | Sharp et al. |
| 7,502,869 B2 | 3/2009 | Boucher et al. |
| 7,519,699 B2 | 4/2009 | Jain et al. |
| 7,543,087 B2 | 6/2009 | Philbrick et al. |
| 7,584,260 B2 | 9/2009 | Craft et al. |
| 7,620,726 B2 | 11/2009 | Craft et al. |
| 7,627,001 B2 | 12/2009 | Craft et al. |
| 7,627,684 B2 | 12/2009 | Boucher et al. |
| 7,640,364 B2 | 12/2009 | Craft et al. |
| 7,664,868 B2 | 2/2010 | Boucher et al. |
| 7,664,883 B2 | 2/2010 | Craft et al. |
| 7,673,072 B2 | 3/2010 | Boucher et al. |
| 7,694,024 B2 | 4/2010 | Philbrick et al. |

| | | | |
|---|---|---|---|
| 7,738,500 | B1 | 6/2010 | Jones et al. |
| 7,809,847 | B2 | 10/2010 | Boucher et al. |
| 7,844,743 | B2 | 11/2010 | Craft et al. |
| 7,853,723 | B2 | 12/2010 | Boucher et al. |
| 2001/0004354 | A1 | 6/2001 | Jolitz |
| 2001/0013059 | A1 | 8/2001 | Dawson et al. |
| 2001/0014892 | A1 | 8/2001 | Gaither et al. |
| 2001/0014954 | A1 | 8/2001 | Purcell et al. |
| 2001/0025315 | A1 | 9/2001 | Jolitz |
| 2001/0037406 | A1 | 11/2001 | Philbrick et al. |
| 2001/0048681 | A1 | 12/2001 | Bilic et al. |
| 2001/0053148 | A1 | 12/2001 | Bilic et al. |
| 2002/0073223 | A1 | 6/2002 | Darnell et al. |
| 2002/0112175 | A1 | 8/2002 | Makofka et al. |
| 2002/0156927 | A1 | 10/2002 | Boucher et al. |
| 2003/0014544 | A1 | 1/2003 | Pettey |
| 2003/0046330 | A1 | 3/2003 | Hayes |
| 2003/0066011 | A1 | 4/2003 | Oren |
| 2003/0067903 | A1 | 4/2003 | Jorgensen |
| 2003/0110344 | A1 | 6/2003 | Szczepanek et al. |
| 2003/0165160 | A1 | 9/2003 | Minami et al. |
| 2004/0010712 | A1 | 1/2004 | Hui et al. |
| 2004/0042458 | A1 | 3/2004 | Elzu |
| 2004/0042464 | A1 | 3/2004 | Elzur et al. |
| 2004/0049580 | A1 | 3/2004 | Boyd et al. |
| 2004/0049601 | A1 | 3/2004 | Boyd et al. |
| 2004/0054814 | A1 | 3/2004 | McDaniel |
| 2004/0059926 | A1 | 3/2004 | Angelo et al. |
| 2004/0088262 | A1 | 5/2004 | Boucher et al. |
| 2004/0153578 | A1 | 8/2004 | Elzur |
| 2004/0158640 | A1 | 8/2004 | Philbrick et al. |
| 2004/0210795 | A1 | 10/2004 | Anderson |
| 2004/0213290 | A1 | 10/2004 | Johnson et al. |
| 2004/0246974 | A1 | 12/2004 | Gyugyi et al. |
| 2004/0249957 | A1 | 12/2004 | Ekis et al. |
| 2005/0060538 | A1 | 3/2005 | Beverly |
| 2005/0144300 | A1 | 6/2005 | Craft et al. |
| 2006/0133386 | A1 | 6/2006 | McCormack et al. |
| 2006/0248208 | A1 | 11/2006 | Walbeck et al. |
| 2007/0083682 | A1 | 4/2007 | Bartley et al. |
| 2007/0140240 | A1 | 6/2007 | Dally et al. |
| 2008/0043732 | A1 | 2/2008 | Desai et al. |
| 2008/0170501 | A1 | 7/2008 | Patel et al. |
| 2008/0209084 | A1 | 8/2008 | Wang et al. |
| 2008/0240111 | A1 | 10/2008 | Gadelrab |
| 2009/0063696 | A1 | 3/2009 | Wang et al. |
| 2009/0086732 | A1* | 4/2009 | Boucher et al. ............... 370/389 |

FOREIGN PATENT DOCUMENTS

| | | |
|---|---|---|
| EP | 695993 A2 | 2/1996 |
| WO | WO 98/19412 | 5/1998 |
| WO | WO 98/50852 | 11/1998 |
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |
| WO | WO 2007/130476 | 11/2007 |

OTHER PUBLICATIONS

Chesson, et al. "The Protocol Engine Chipset." IEEE Symposium Record from Hot Chips III. Aug. 26-27, 1991. 16 pages.

MacLean et al. "An Outboard Processor for High Performance Implementation of Transport Layer Protocols." IEEE Global Telecommunications Conference, Globecom '91, presentation. Dec. 2-5, 1991. 7 pages.

Ross et al. "FX1000: A high performance single chip Gigabit Ethernet NIC." IEEE article from Compcon '97 Proceedings. Feb. 23-26, 1997. 7 pages.

Strayer et al. "Ch. 9: The Protocol Engine." From XTP: The Transfer Protocol. Jul. 1992. 12 pages.

Publication entitled "Protocol Engine Handbook." Oct. 1990. 44 pages.

Koufopavlou et al. "Parallel TCP for High Performance Communication Subsystems." IEEE Global Telecommunications Conference, Globecom '92, presentation. Dec. 6-9, 1992. 7 pages.

Lilienkamp et al. "Proposed Host-Front End Protocol." Dec. 1984. 56 pages.

Thia et al. "High-Speed OSI Protocol Bypass Algorithm with Window Flow Control." Protocols for High Speed Networks. 1993. pp. 53-68.

Jolitz, William et al. "TCP/IP Network Accelerator and Method of Use." filed Jul. 17, 1997. U.S. Appl. No. 60/053,240.

Thia et al. "A Reduced Operational Protocol Engine (ROPE) for a multiple-layer bypass architecture." Protocols for High Speed Networks. 1995. pp. 224-239.

Form 10-K for Exelan, Inc., for the fiscal year ending Dec. 31, 1987. 10 pages.

Form 10-K for Exelan, Inc., for the fiscal year ending Dec. 31, 1988. 10 pages.

Merritt, Rick. "Ethernet Interconnect Outpacing Infiniband at Intel." EE Times article. Sep. 11, 2002. 9 pages.

Starr, David D. et al. "Intelligent Network Storage Interface Device." for U.S. Appl. No. 09/675,700. Confirmation No. 9585; filed Sep. 29, 2000.

Boucher, Laurence B. et al. "Intelligent Network Interface System and Method for Accelerated Protocol Processing." U.S. Appl. No. 09/692,561. Confirmation No. 5890; filed Oct. 18, 2000.

Craft, Peter K. et al. "Transferring Control of TCP Connections Between Hierarchy of Processing Mechanisms." U.S. Appl. No. 11/249,006. Confirmation No. 3046; filed Oct. 11, 2005.

Starr, Daryl D. et al. "Accelerating Data Transfer in a Virtual Computer System with Tightly Coupled TCP Connections." U.S. Appl. No. 12/410,366. Confirmation No. 3065; filed Mar. 24, 2009.

Craft, Peter, K. et al. "TCP Offload Send Optimization." U.S Appl. No. 12/504,021, Confirmation No. 9303; filed Jul. 16, 2009.

Craft, Peter K. et al. "TCP Offload Device the Batches Session Layer Headers to Reduce Interrupts as Well as CPU Copies." U.S. Appl. No. 12/581,342, Confirmation No. 2393; filed Oct. 19, 2009.

Philbrick, Clive M. et al. "Freeing Transmit Memory on a Network Interface Device Prior to Receiving an Acknowledgment That Transmit Data Has Been Received by a Remote Device." U.S. Appl. No. 12/470,980. Confirmation Number: 4934; filed May 22, 2009.

Boucher, Laurence B. et al. "Obtaining a Destination Address So That a Network Interface Device Can Write Network Data Without Headers Directly Into Host Memory." U.S. Appl. No. 12/325,941. Confirmation Number: 2493; filed Dec. 1, 2008.

Boucher, Laurence B. et al. "Enabling an Enhanced Function of an Electronic Device." U.S. Appl. No. 11/985,948. Confirmation Number: 9878; filed Nov. 19, 2007.

Starr, Daryl D. et al. "Network Interface Device With 10 Gb/s Full-Duplex Transfer Rate." U.S. Appl. No. 11/799,720. Confirmation Number: 6200; filed May 1, 2007.

Craft, Peter K. et al. "Peripheral Device That DMAS the Same Data to Different Locations in a Computer." U.S. Appl. No. 11/788,719. Confirmation Number: 5750; filed Apr. 19, 2007.

Starr, Daryl D. et al. "TCP/IP Offload Device With Reduced Sequential Processing." U.S. Appl. No. 11/348,810. Confirmation No. 8739; filed Feb. 6, 2006.

Craft, Peter K. et al. "Protocol Stack That Offloads a TCP Connection From a Host Computer to a Network Interface Device." U.S. Appl. No. 11/027,842. Confirmation No. 6231; filed Dec. 30, 2004.

Boucher, Laurence B. et al. "Method and Apparatus for Dynamic Packet Batching With a High Performance Network Interface." U.S. Appl. No. 10/678,336. Confirmation No. 9798; filed Oct. 3, 2003.

Philbrick Clive M. et al. "Method and Apparatus for Data Re-Assembly With a High Performance Network Interface." U.S. Appl. No. 10/634,062. Confirmation No. 5537; filed Aug. 4, 2003.

Boucher, Laurence B. et al. "High Network Interface Device and System for Accelerated Communication." U.S. Appl. No. 10/601,237. Confirmation No. 9286; filed Jun. 19, 2003.

Boucher, Laurence B. et al. "Method and Apparatus for Distributing Network Traffic Processing on a Multiprocessor Computer." U.S. Appl. No. 10/438,719. Confirmation No. 7151; filed May 14, 2003.

Boucher, Laurence B. et al. "Parsing a Packet Header." U.S. Appl. No. 10/277,604. Confirmation No. 7644; filed Oct. 18, 2002.

Starr, Daryl D.. et al. "Intelligient Network Storage Interface System." U.S. Appl. No. 10/261,051. Confirmation No. 6753; filed Sep. 30, 2002.
Chandranmenon, Girish P. et al. "Trading Packet Headers for Packet Processing." IEEE/ACM Transactions on Networking, vol. 4, No. 2. Apr. 1996. pp. 141-152.
U.S. Appl. No. 08/964,304, entitled "File Array Storage Architecture." filed Nov. 4, 1997. Inventors Napolitano et al.
The Final Office Action for U.S. Appl. No. 11/027,842 mailed on Dec. 3, 2010.
Stevens, et al., "TCP/IP Illustrated, vol. 2." pp. 754-757 1995.
Stevens, Richard. "TCP/IP Illustrated, vol. 1." Chapters 1 and 17. Published 1994; 13th printing. 1999.
"Hardware Assisted Protocol Processing", (which Eugene Feinber is working on). Downloaded from the internet and printed on Nov. 25, 1998. 1 page.
"Z85C30 CMOS SCC Serial Communication Controller", Zilog Inc. Zilog product Brief. 1997. 3 pages.
"Smart LAN Work Requests." Internet pages of Xpoint Technologies, Inc. printed Dec. 19, 1997. 5 pages.
"Asante and 100BASE-T Fast Ethernet." Internet pages printed May 27, 1997. 7 pages.
"A Guide to the Paragon XP/S-A7 Supercomputer at Indiana University." Internet pages printed Dec. 21, 1998. 13 pages.
Stevens, Richard. "TCP/IP Illustrated, vol. 1, The Protocols." 1994. pp. 325-326.
"Northridge/Southbridge vs. Intel Hub Architecture." Internet pages printed Feb. 19, 2001. 4 pages.
"Gigabit Ethernet Technical Brief, Achieving End-to-End Performance." Alteon Networks, Inc., First Edition. Sep. 1996. 15 pages.
"Technical Brief on Alteon Ethernet Gigabit NIC Technology." Internet pages downloaded from www.alteon.com. Printed Mar. 15, 1997. 14 pages.
"VT8501 Apollo MVP4." VIA Technologies, Inc. Revision 1.3. Feb. 1, 2000. pp. i-iv, 1-11, cover and copyright page.
"iReady Rounding Out Management Team with Two Key Executives." iReady News Archives article downloaded from http://www.ireadyco.com/archives/keyexec.html. Printed Nov. 28, 1998. 2 pages.
"The Internet Tuner." Internet pages from iReady Products, web sitehttp://www.ireadyco.com/products2html. Printed Nov. 25, 1998. 2 pages.
iReady News Archives, Toshiba, iReady shipping Internet chip. Printed Nov. 25, 1998. 1 page.
"Technology." Interprophet article downloaded fromhttp://www.interprophet.com/technology.html. Printed Mar. 1, 2000. 17 pages.
"The I-1000 Internet Tuner." iReady Corporation article. Date unknown. 2 pages.
"About Us Introduction." iReady article downloaded from the internet http://www.iReadyco.com/about.html. Pritned Nov. 25, 1998. 3 pages.
"Revolutionary Approach to Consumer Electronics Internet Connectivity Funded." iReady News Archive article. San Jose, California. Nov. 20, 1997 (printed Nov. 2, 1998). 2 pages.
"Seiko Instruments Inc. (SII) Introduces World's First Internet-Ready Intelligent LCD Modules Based on iReady Technology." iReady News Archive article. Santa Clara, CA and Chiba, Japan. Oct. 26, 1998 (printed Nov. 2, 1998). 2 pages.
"iReady internet Tuner to Web Enable Devices." NEWSwatch article. Tuesday, Nov. 5, 1996 (printed Nov. 2, 1998). 2 pages.
Lammers, David. "Tuner for Toshiba, Toshiba Taps iReady for Internet Tuner." EE Times article. Printed Nov. 2, 1998. 2 pages.
Carbone, J.S. "Comparison of Novell Netware and TCP/IP Protocol Architectures." Printed Apr. 10, 1998. 19 pages.
"AEA-7110C-a DuraSAN product." Adaptec article. Printed Oct. 1, 2001. 11 pages.
"iSCSI and 2Gigabit fibre Channel Host Bus Adapters from Emulex, QLogic, Adaptec, JNI." iSCSI HBA article. Printed Oct. 1, 2001. 8 pages.

"FCE-3210/6410 32 and 64-bit PCI-to-Fibre Channel HBA." iSCSI HBA article. Printed Oct. 1, 2001. 6 pages.
"iSCSI Storage." ISCSI.com article. Pritned Oct. 1, 2001. 2 pages.
Kalampoulkas et al. "Two-Way TCP Traffic Over Rate Controlled Channels: Effects and Analysis." IEEE Transactions on Networking. vol. 6, No. 6. Dec. 1998. 17 pages.
"Toshiba Delivers First Chips to Make Consumer Devices Internet-Ready Based on iReady Design." IReady News article. Santa Clara, CA, and Tokyo, Japan. Oct. 14, 1998 (printed Nov. 2, 1998). 3 pages.
Jolitz, Lynne. "Frequently Asked Questions." Internet pages of InterProphet. Printed Jun. 14, 1999. 4 pages.
Hitz et al. "File System Design for an NFS File Server Appliance." Winter of 1992. 13 pages.
"Adaptec Announces EtherStorage Technology." Adaptec Press Release article. May 4, 2000 (printed Jun. 15, 2000). 2 pages.
"EtherStorage Frequently Asked Questions." Adapted article. Printed Jul. 19, 2000. 5 pages.
"EtherStorage White Paper." Adapted article. Printed Jul. 19, 2000. 7 pages.
Berlino, J. et al. "Computers; Storage." CIBC World Markets article. Aug. 7, 2000. 9 pages.
Milunovich, S. Merrill Lynch article entitled "Storage Futures." Merrill Lynch article. May 10, 2000. 22 pages.
Taylor, S. "Montreal Start-Up Battles Data Storage Bottleneck." CBS Market Watch article. Mar. 5, 2000 (printed Mar. 7, 2000). 2 pages.
Satran, J. et al. "SCSI/TCP (SCSI over TCP)." Internet-draft article. Feb. 2000 (printed May 19, 2000). 38 pages.
"Technical White Paper-Xpoint's Disk to LAN Acceleration Solution for Windows NT Server." Internet pages. Printed Jun. 5, 1997. 14 pages.
Harrer, Christopher et al. "Network Accelerator Chip Architecture, twelve-slide presentation." Jato Technologies article. Printed Aug. 19, 1998. 13 pages.
"Enterprise System Uses Flexible Spec." EETimes article. Aug. 10, 1998 (printed Nov. 25, 1998). 3 pages.
"Smart Ethernet Network Interface Cards," which Berend Ozceri is developing. Internet pages. Printed Nov. 25, 1998. 2 pages.
"GigaPower Protocol Processor Product Review." Internet pages of Xaqti corporation. Printed Nov. 25, 1999. 4 pages.
Oren, Amit (inventor). Assignee: Siliquent Technologies Ltd. "CRC Calculations for Out of Order PUDs." U.S. Appl. No. 60/283,896, filed Apr. 12, 2003.
Walsh, Robert J. "DART: Fast Application Level Networking via Data-Copy Avoidance." Internet pages. Printed Jun. 3, 1999. 25 pages.
Tanenbaum, Andrew S. Computer Networks, Third Edition, ISBN 0-13-349945-6. Mar. 6, 1996.
Druschel, Peter et al. "LRP: A New Network Subsystem Architecture for Server Systems." Article from Rice University. Oct. 1996. 14 pages.
"TCP Control Block Interdependence." Internet RFC/STD/FYI/BCP Archives article with heading "RFC2140" web address http://www.faqs.org/rfcs/rfc2140.html. Printed Sep. 2, 2002. 9 pages.
"Tornado: for Intelligent Network Acceleration." WindRiver article. Copyright Wind River Systems. 2001. 2 pages.
"Complete TCP/IP Offload for High-Speed Ethernet Networks." WindRiver White Paper. Copyright Wind River Systems. 2002. 7 pages.
"Solving Server Bottlenecks with Intel Server Adapters." Intel article. Copyright Intel Corporation. 1999. 8 pages.
Schwaderer et al. "XTP in VLSI Protocol Decomposition for ASIC Implementation." IEEE Computer Society Press publication from 15th Conference on Local Computer Networks. Sep. 30-Oct. 3, 1990. 5 pages.

* cited by examiner

TCP/IP OFFLOAD DEVICE

CROSS-REFERENCE TO RELATED APPLICATIONS

This application claims the benefit under 35 U.S.C. §120 of (is a continuation-in-part of) U.S. patent application Ser. No. 12/325,941, filed Dec. 1, 2008, which in turn claims the benefit under 35 U.S.C. §120 of (is a continuation of) U.S. patent application Ser. No. 10/881,271, filed Jun. 29, 2004, now U.S. Pat. No. 7,461,160; which in turn claims the benefit under 35 U.S.C. §120 of (is a continuation of) U.S. patent application Ser. No. 09/789,366, now U.S. Pat. No. 6,757,746, filed Feb. 20, 2001, which in turn claims the benefit under 35 U.S.C. §120 of (is a continuation-in-part of) U.S. patent application Ser. No. 09/464,283, now U.S. Pat. No. 6,427,173, filed Dec. 15, 1999; which in turn claims the benefit under 35 U.S.C. §120 of (is a continuation of) U.S. patent application Ser. No. 09/439,603, now U.S. Pat. No. 6,247,060, filed Nov. 12, 1999, which in turn claims the benefit under 35 U.S.C. §. 120 of (is a continuation of) U.S. patent application Ser. No. 09/067,544, now U.S. Pat. No. 6,226,680, filed Apr. 27, 1998; and which in turn claims the benefit under 35 U.S.C. §119(e)(1) of the Provisional Application filed under 35 U.S.C. §111(b), Ser. No. 60/061,809, filed on Oct. 14, 1997.

The present application also claims the benefit under 35 U.S.C. §120 of (and is a continuation-in-part of) U.S. patent application Ser. No. 11/027,842, filed Dec. 30, 2004, which in turn claims the benefit under 35 U.S.C. §120 of (and is a continuation of) U.S. patent application Ser. No. 10/706,398, filed Nov. 12, 2003, now U.S. Pat. No. 6,941,386, which in turn claims the benefit under 35 U.S.C. §120 of (and is a continuation of) U.S. patent application Ser. No. 10/208,093, filed Jul. 29, 2002, now U.S. Pat. No. 6,697,868, which in turn claims the benefit under 35 U.S.C. §120 of (and is a continuation-in-part of) U.S. patent application Ser. No. 09/514,425, filed Feb. 28, 2000, now U.S. Pat. No. 6,427,171, which in turn claims the benefit under 35 U.S.C. §120 of (and is a continuation-in-part of): a) U.S. patent application Ser. No. 09/141,713, filed Aug. 28, 1998, now U.S. Pat. No. 6,389,479, which in turn claims the benefit under 35 U.S.C. §119 of provisional application 60/098,296, filed Aug. 27, 1998; b) U.S. patent application Ser. No. 09/067,544, filed Apr. 27, 1998, now U.S. Pat. No. 6,226,680, which in turn claims the benefit under 35 U.S.C. §119 of provisional application 60/061,809, filed Oct. 14, 1997; and c) U.S. patent application Ser. No. 09/384,792, filed Aug. 27, 1999, now U.S. Pat. No. 6,434,620, which in turn claims the benefit under 35 U.S.C. §119 of provisional application 60/098,296, filed Aug. 27, 1998.

The subject matter of all of the above-identified patent applications (including the subject matter in the Microfiche Appendix of U.S. application Ser. No. 09/464,283), and of the two above-identified provisional applications, is incorporated by reference herein.

TECHNICAL FIELD

The present invention relates generally to computer or other networks, and more particularly to protocol processing for information communicated between hosts such as computers connected to a network.

BACKGROUND INFORMATION

One of the most CPU intensive activities associated with performing network protocol processing is the need to copy incoming network data from an initial landing point in system memory to a final destination in application memory. This copying is necessary because received network data cannot generally be moved to the final destination until the associated packets are: A) analyzed to ensure that they are free of errors, B) analyzed to determine which connection they are associated with, and C) analyzed to determine where, within a stream of data, they belong. Until recently, these steps had to be performed by the host protocol stack. With the introduction of the intelligent network interface device (as disclosed in U.S. patent application Ser. Nos. 09/464,283, 09/439,603, 09/067,544, and U.S. Provisional Application Ser. No. 60/061,809), these steps may now be performed before the packets are delivered to the host protocol stack.

Even with such steps accomplished by an intelligent network interface device, there is another problem to be addressed to reduce or eliminate data copying, and that is obtaining the address of the destination in memory and passing that address to the network interface device. Obtaining this address is often difficult because many network applications are written in such a way that they will not provide the address of the final destination until notified that data for the connection has arrived (with the use of the "select( )" routine, for example). Other attempts to obtain this address involve the modification of existing applications. One such example is the Internet Engineering Task Force (IETF) Remote DMA (RDMA) proposal, which requires that existing protocols such as NFS, CIFS, and HTTP be modified to include addressing information in the protocol headers. A solution is desired that does not require the modification of existing applications or protocols.

SUMMARY

A multi-packet message (for example, a session layer message) is to be received onto a Network Interface device (NI device) and the data payload of the message is to be placed into application memory in a host computer. The NI device receives the first packet of the message and passes a first part of this first packet to the operating system on the host. In one embodiment, the first part of the first packet includes the session layer header of the message. The operating system passes this first part of the first packet to an application program. The application program uses the first part of the first packet to identify an address of a destination in application memory where the entire data payload is to be placed. The application program returns the address to the operating system and the operating system in turn forwards the address to the NI device. The NI device then uses the address to place the data portions of the various packets of the multi-packet message into the destination in application memory. In one embodiment, the NI device DMAs the data portions of the packets from the NI device directly into the destination. In some embodiments, the NI device DMAs only data into the destination such that the destination contains the data payload in one contiguous block without any session layer header information, without any transport layer header information, and without any network layer header information.

In some embodiments, the NI device is an interface card that is coupled to the host computer via a parallel bus (for example, the PCI bus). In other embodiments, the NI device is integrated into the host computer. For example, the NI device may be part of communication processing device (CPD) that is integrated into the host computer.

Other structures and methods are described in the detailed description below. This summary does not purport to define the invention. The invention is defined by the claims.

DETAILED DESCRIPTION

Figure 1:
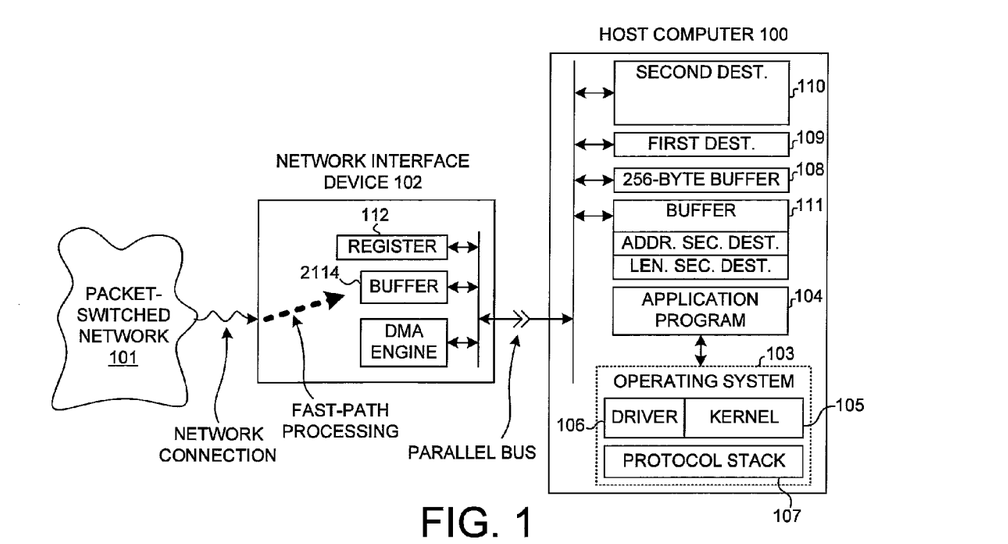
FIG. 1 is a diagram of a Network Interface Device (NI device) in accordance with an embodiment of the present invention. The NI device performs fast-path processing on information passing from a packet-switched network (for example, the Internet), through the NI device, and to a host computer.

FIG. 1 is a diagram of a host computer 100 that is coupled to a packet-switched network 101 (for example, the Internet) via a Network Interface (NI) device 102. In the illustrated example, host computer 100 is an Intel x86-based system (for example, Compaq Proliant). Software executing on host computer 100 includes: 1) a Linux operating system 103, and 2) an application program 104 by the name of "Samba". Operating system 103 includes a kernel 105. Kernel 105 includes: 1) driver software 106 for interfacing to and controlling NI device 102, and 2) a protocol stack 107. A part of protocol stack 107 is specially customized to support the NI device 102.

In one specific embodiment, NI device 102 is the Intelligent Network Interface Card (INIC) of FIGS. 21 and 22 of U.S. patent application Ser. No. 09/464,283 (the entire disclosure of 09/464,283 is incorporated herein by reference). The NI device 102 in this specific embodiment is an expansion card that plugs into a card edge connector on the host computer (for example, a personal computer). The card includes an application specific integrated circuit (ASIC) (for example, see ASIC 400 of FIG. 21 of U.S. application Ser. No. 09/464,283) designed by Alacritech, Inc. of 234 East Gish Road, San Jose, Calif. 95112. The card performs "fast-path processing" in hardware as explained in U.S. application Ser. No. 09/464,283. An INIC card (Model Number 2000-100001 called the "Alacritech 100x2 Dual-Server Adapter") is available from Alacritech, Inc. of 234 East Gish Road, San Jose, Calif. 95112.

Figure 2:
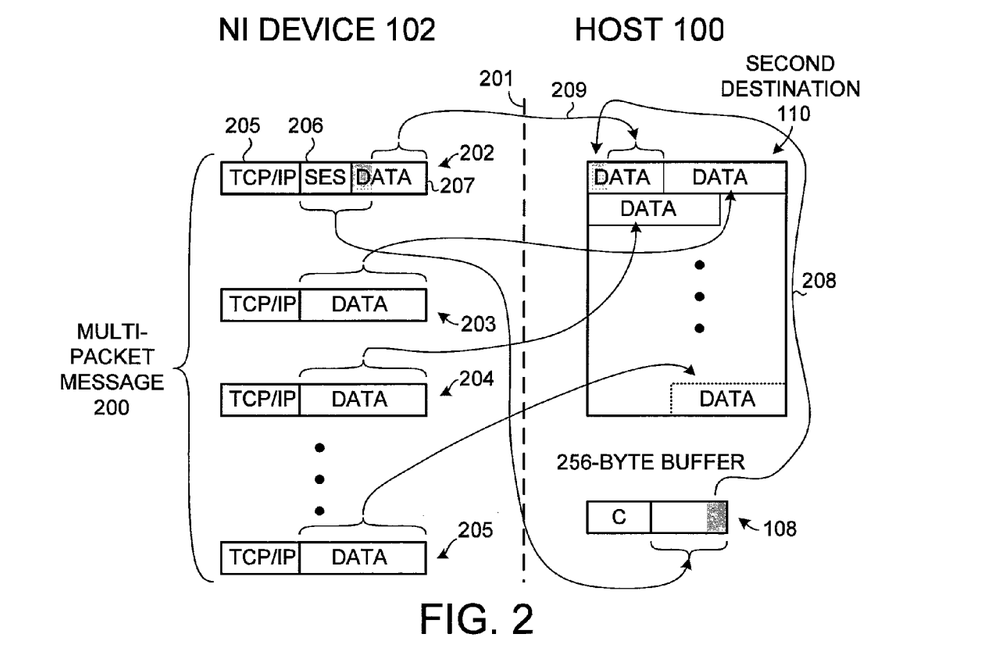
FIG. 2 is a diagram that illustrates a method in accordance with an embodiment of the present invention where network data from a multi-packet session message is transferred by the NI device directly into a destination in a host computer.

FIG. 2 is a diagram illustrating the transfer of data in a multi-packet session layer message 200 from a buffer 2114 (see FIG. 1) in NI device 102 to a second destination 110 in memory in host computer 100. The portion of the diagram to the left of the dashed line 201 (see FIG. 2) represents NI device 102, whereas the portion of the diagram to the right of the dashed line 201 represents host computer 100. Multi-packet message 200 includes approximately forty-five packets, four of which (202-205) are labeled on FIG. 2. The first packet 202 includes a portion 205 containing transport and network layer headers (for example, TCP and IP headers), a portion 206 containing a session layer header, and a portion 207 containing data. The subsequent packets 203-205 do not contain session layer header information, but rather include a first portion containing transport and network layer headers (for example, TCP and IP headers), and a second portion containing data.

Figure 3:
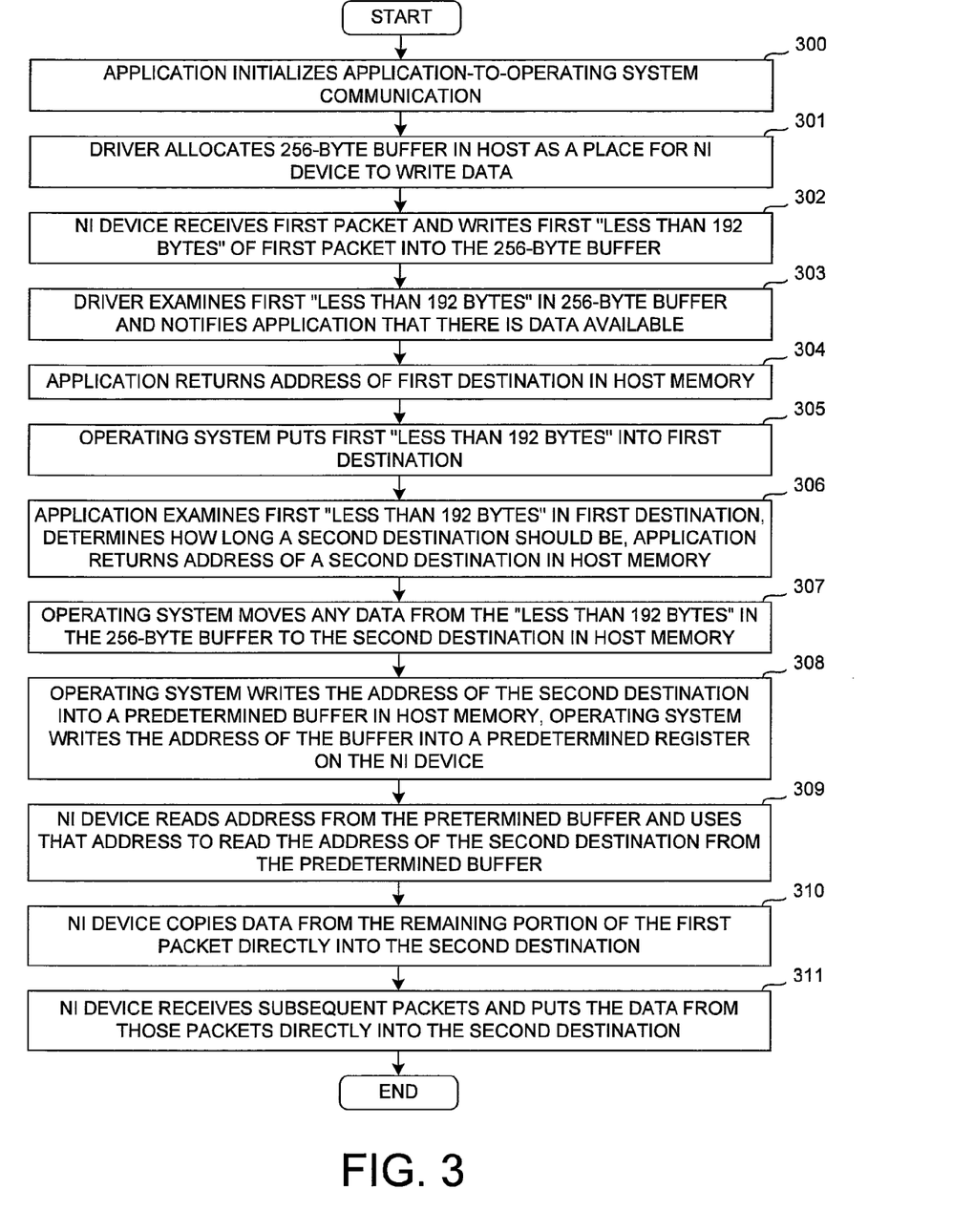
FIG. 3 is a flowchart of a method in accordance with an embodiment of the present invention.

FIG. 3 is a flowchart of a method in accordance with one specific embodiment of the present invention. In a first step (step 300), the Samba application program 104 initializes application-to-operating system communication by calling the "socket" function. The socket function causes kernel 105 to allocate a communication control block (CCB) that will be used to manage the connection. The Samba application program 104 then uses the "bind" routine to associate the socket with a particular local IP address and IP port. The Samba application program 104 then calls the "listen" routine to wait for an incoming connection to arrive from kernel 105. When an incoming connection arrives, the Samba application program 104 calls the "accept" routine to complete the connection setup. After setting up the socket, the Samba application program 104 uses the "select" routine to tell the kernel 105 to alert application 104 when data for that particular connection has arrived.

In a next step (step 301), driver 106 allocates a 256-byte buffer 108 in host memory as a place where NI device 102 can write data. Driver 106 then passes the address of 256-byte buffer 108 to NI device 102 so that NI device 102 can then use that address to write information into 256-byte buffer 108. Driver 106 does this by writing the address of 256-byte buffer 108 into a register 112 on the NI device 102. A status field at the top of the 256byte buffer 108 contains information indicating whether the 256-byte buffer contains data (and is valid) or not.

In step (step 302), NI device 102 receives the first packet 202 of message 200 (see FIG. 2) from network 101. NI device 102 looks at the IP source address, IP destination address, TCP source port and TCP destination port and from those four values determines the connection identified with the packet. (IP is the network layer. TCP is the transport layer.) NI device 102 then: 1) writes a unique identifier that identifies the connection into a designated field in the 256-byte buffer 108; 2) writes the first 192 bytes of the first packet into the 256-byte buffer (the MAC, IP and TCP headers are not written to the 256-byte buffer); 3) sets the status field of 256-byte buffer 108 to indicate that the 256-byte buffer is full; and 4) interrupts the kernel 105.

In a next step (step 303), kernel 105 responds by having the driver 106 look at the status field of the 256-byte buffer 108. If the status field indicates 256-byte buffer 108 is full and valid, then driver 106 passes the address of 256-byte buffer 108 to protocol stack 107. The first part of this 192 bytes is session layer header information, whereas the remainder of the 192 bytes is session layer data. Protocol stack 107 notifies application program 104 that there is data for the application program. Protocol stack 107 does this by making a call to the "remove_wait_queue" routine.

In a next step (step 304), the Samba application program 104 responds by returning the address of a first destination 109 in host memory. The Samba application program 104 does this by calling a socket routine called "recv". The "recv" socket routine has several parameters: 1) a connection identifier that identifies the connection the first destination 109 will be for, 2) an address of the first destination 109 where the data will be put, and 3) the length of the first destination 109. (In some embodiments, Samba application program 104 calls "recv" to request less than 192 bytes.) Through this "recv" socket routine, kernel 105 receives from application program 104 the address of the first destination 109 and the length of the first destination 109. Kernel 105 then gives the address of the first destination 109 to the protocol stack 107.

In a next step (step 305), the protocol stack 107 moves the requested bytes in 256-byte buffer 108 to first destination 109 identified by the address. The first destination is in memory space of the application program 104 so that application program 104 can examine the requested bytes. If the application program 104 requested less than 192 bytes using "recv", then driver 106 moves that subset of the 192 bytes to first destination 109 leaving the remainder of the 192 bytes in the 256-byte buffer. On the other hand, if the application program 104 requested all 192 bytes using "recv", then driver 106 moves the full 192 bytes to first destination 109.

In a next step (step 306), the application examines the requested bytes in first destination 109. Application program 104 analyzes the session layer header portion, determines the amount of session layer data coming in the session layer message, and determines how long a second destination 110 should be so as to contain all the remaining session layer data of message 200. Application program 104 then returns to kernel 105 the address of second destination 110 and the length of the second destination 110. Application program 104 does this by calling the socket routine "recv". Kernel 105 receives the address of second destination 110 and the length of the second destination 110 and gives that information to the protocol stack 107.

In a next step (step 307), the protocol stack 107 moves any session layer data in the 192 bytes (not session layer headers) in 256-byte buffer 108 to second destination 110 identified by the second address. This move of data is shown in FIG. 2 by arrow 208.

In a next step (step 308), the protocol stack 107 writes the address of second destination 110 and the length of second destination 110 into a predetermined buffer 111 in host memory. Driver 106 then writes the address of predetermined buffer 111 to a predetermined register 112 in NI device 102.

In a next step (step 309), NI device 102 reads the predetermined register 112 and retrieves the address of predetermined buffer 111. Using this address, NI device 102 reads the predetermined buffer 111 by DMA and retrieves the address of second destination 110 and the length of second destination 110.

In some embodiments, the second destination 110 is actually made up of a plurality of locations having different addresses of different lengths. The application program supplies a single virtual address for the NI device 102 to read (such as explained in step 310), but this virtual address is made up of many different physical pages. Driver 106 determines the addresses of the pages that are associated with this virtual address and passes these physical addresses and their lengths to NI device 102 by placing the addresses in predetermined buffer 111 and writing the address of predetermined buffer 111 to predetermined register 112 in NI device 102.

In a next step (step 310), NI device 102 transfers the data from the remaining portion of first packet 202 (without any session layer headers, and without any TCP or IP headers) directly into second destination 110 using DMA. In this example, the transfer is made across a parallel data bus (for example, across a PCI bus by which the NI device 102 is coupled to the host computer 100). This move of data is shown in FIG. 2 by arrow 209.

In a next step (step 311), subsequent packets are received onto NI device 102. For each packet, NI device 102 removes the TCP and IP headers and writes the remaining data (without session layer headers, TCP headers, or IP headers) directly to second destination 110 using DMA (for example, NI device 102 may write the data directly into the second destination across the PCI bus by which the NI device 102 is coupled to the host computer 100). The data from the many packets of the session layer message is written into second destination 110 such that there are no session layer headers, transport layer headers, or network layer headers between the data portions from the various packets of message 200.

In the above described specific embodiment, there is no session layer header, transport layer header, or network layer header between the data portions from the various packets of message 200 as the data portions are deposited into the second destination 110. This need not be the case, however. In some embodiments, session layer header information does appear in second destination 110. This is so because it is the application program that determines the length of the second destination 110.

In some embodiments, application program 104 returns a first destination that is larger than 192 bytes. In that case, there is no different second destination. The entire 192 bytes contained in the 256-byte buffer is moved to the first destination. The address of the remainder is given to the NI device as described above with respect to the second destination.

Figure 4:
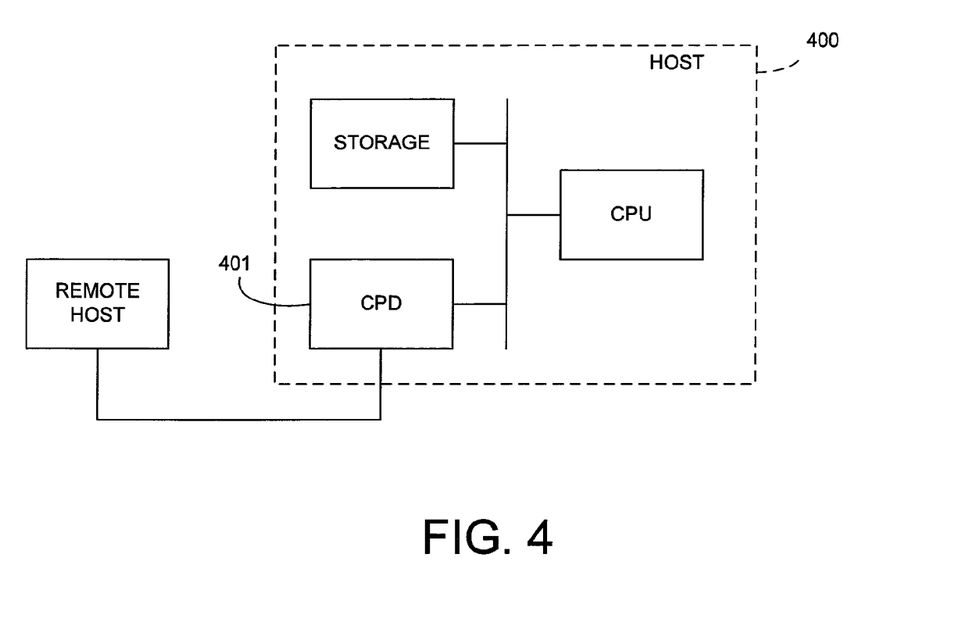
FIG. 4 shows an NI device integrated into a host computer.

Although the NI device may be realized on an expansion card and interfaced to the host computer via a bus such as the PCI bus, the NI device can also be integrated into the host computer. For example, the NI device in some embodiments is disposed on the motherboard of the host computer and is substantially directly coupled to the host CPU. The NI device may, for example, be integrated into a memory controller integrated circuit or input/output integrated circuit that is coupled directly to the local bus of the host CPU. The NI device may be integrated into the Intel 82815 Graphics and Memory Controller Hub, the Intel 440BX chipset, or the Apollo VT8501 MVP4 Northbridge chip. FIG. 4 shows an NI device integrated into a host computer 400 in the form of a communication processing device (CPD) 401.

Although the present invention is described in connection with certain specific embodiments for instructional purposes, the present invention is not limited thereto. Advantages of the present invention may be realized wherein either no header information or just an insubstantial amount of header information is transferred from the network interface device into the second destination. All the data from the session layer message may be deposited into a single contiguous block of host memory (referred to as a destination) in some embodiments or may be deposited into several associated blocks (that together are referred to as a destination) of host memory in other embodiments. Accordingly, various modifications, adaptations, and combinations of various features of the described embodiments can be practiced without departing from the scope of the invention as set forth in the claims.

What is claimed is:

1. A method comprising:
receiving, by a network interface that is coupled to a computer, a plurality of network packets that each contain data, an Internet Protocol (IP) header and a Transmission Control Protocol (TCP) header;
processing the IP and TCP headers of the packets by the network interface, including maintaining a TCP connection on the network interface corresponding to the packets and corresponding to an application running on the computer;
obtaining a destination for the data in a memory of the computer, such that information that is later stored in the destination will be controlled by the application;
providing an indication of the destination from the computer to the network interface; and
transferring the data to the destination, without transferring the IP headers or the TCP headers of the plurality of packets to the destination, and without processing the IP headers or the TCP headers by the computer.

2. The method of claim 1, wherein the network interface and the computer both perform TCP processing for the TCP connection.

3. The method of claim 1, wherein processing the IP and TCP headers of the packets by the network interface is performed by hardware fast-path processing.

4. The method of claim 1, wherein obtaining the destination for the data in the memory of the computer includes providing, by the network interface to the computer, a session layer header from one of the packets.

5. The method of claim 1, wherein obtaining the destination for the data in the memory of the computer includes analyzing a session layer header from one of the packets.

6. The method of claim 1, wherein the application is denoted by a port number in the TCP header of the packets.

7. The method of claim 1, wherein transferring the data to the destination is performed by direct memory access (DMA) of the network interface to a memory of the computer.

8. A method comprising:
receiving, by a network interface that is coupled to a computer, a plurality of packets that correspond to a Transmission Control Protocol (TCP) connection, each containing data, an Internet Protocol (IP) header and a TCP header, wherein the data is for a network file system application running on the computer;
processing the IP and TCP headers of the packets by the network interface, including maintaining the TCP connection on the network interface;
providing, by the network interface to the computer, a session layer header from one of the packets;
analyzing, by the computer, the session layer header, including obtaining a destination for the data in a memory of the computer, such that information that is later stored in the destination will be controlled by the application; and
transferring the data to the destination, without transferring the IP headers or the TCP headers of the plurality of packets to the destination, and without processing the IP headers or the TCP headers by the computer.

9. The method of claim 8, wherein the network interface and the computer both perform TCP processing for the TCP connection.

10. The method of claim 8, wherein processing the IP and TCP headers of the packets by the network interface is performed by hardware fast-path processing.

11. The method of claim 8, further comprising storing, by the network interface, the data from the packets without the IP headers or the TCP headers prior to transferring, by the network interface, the data to the destination.

12. The method of claim 8, wherein the application is denoted by a port number in the TCP header of the packets.

13. The method of claim 8, wherein transferring the data to the destination is performed by direct memory access (DMA) of the network interface to a memory of the computer.

14. A method comprising:
receiving, by a network interface that is coupled to a computer, a plurality of packets that correspond to a Transmission Control Protocol (TCP) connection, each containing data, an Internet Protocol (IP) header and a TCP header, wherein the data is for an application running on the computer;
processing the IP and TCP headers of the packets by the network interface, including maintaining the TCP connection on the network interface;
providing, by the network interface to the computer, a header portion of one of the packets;
analyzing, by the computer, the header portion, including obtaining a destination for the data in a memory of the computer, such that information that is later stored in the destination will be controlled by the application; and
transferring the data to the destination, without transferring the IP headers or the TCP headers of the plurality of packets to the destination, and without processing the IP headers or the TCP headers by the computer.

15. The method of claim 14, wherein the network interface and the computer both perform TCP processing for the TCP connection.

16. The method of claim 14, wherein processing the IP and TCP headers of the packets by the network interface is performed by hardware fast-path processing.

17. The method of claim 14, wherein the application is denoted by a port number in the transport layer header of the packets.

18. The method of claim 14, wherein transferring the data to the destination is performed by direct memory access (DMA) of the network interface to a memory of the computer.

19. The method of claim 14, wherein the header portion includes a session layer header.

* * * * *